United States Patent [19]
Maeda et al.

[11] Patent Number: 5,557,401
[45] Date of Patent: Sep. 17, 1996

[54] OPTICAL MASKING APPARATUS

[75] Inventors: Mikio Maeda; Masaaki Furuhashi, both of Tokyo, Japan

[73] Assignee: Ando Electric Co., Ltd., Tokyo, Japan

[21] Appl. No.: 318,360

[22] Filed: Oct. 5, 1994

[30] Foreign Application Priority Data

Oct. 13, 1993 [JP] Japan .................................. 5-280049

[51] Int. Cl.⁶ .......................... G01N 21/88; G02B 26/04
[52] U.S. Cl. ........................................ 356/73.1; 359/234
[58] Field of Search ........................ 356/73.1; 359/230, 359/234

[56] References Cited

U.S. PATENT DOCUMENTS

| | | | |
|---|---|---|---|
| 3,525,873 | 8/1970 | Nomarski et al. | 359/230 X |
| 4,524,271 | 6/1985 | Parker | 359/234 X |
| 4,769,534 | 9/1988 | Brand | 250/214 R |
| 4,838,689 | 6/1989 | Neumann | 356/73.1 |
| 4,989,971 | 2/1991 | McDonald | 356/73.1 |

*Primary Examiner*—Vincent P. McGraw
*Attorney, Agent, or Firm*—Flynn, Thiel, Boutell & Tanis, P.C.

[57] ABSTRACT

An optical masking apparatus of an OTDR capable of lowering insertion loss and of easily aligning optical axes and of being structured at low cost. The apparatus comprises an optical pulse generating means, an optical branching coupler for permitting an optical pulse generated by the optical pulse generating means to be incident to an optical fiber to be measured, and an optical chopper means to which a reflected light from the optical fiber is incident by way of the optical branching coupler wherein the optical chopper means operates in synchronization with the optical pulse to remove a desired range of the reflected light. A light signal supplied to an optical/electric transducer from the optical chopper means is converted into an electric signal, which is displayed on an indicator by way of a signal processing circuit.

10 Claims, 5 Drawing Sheets

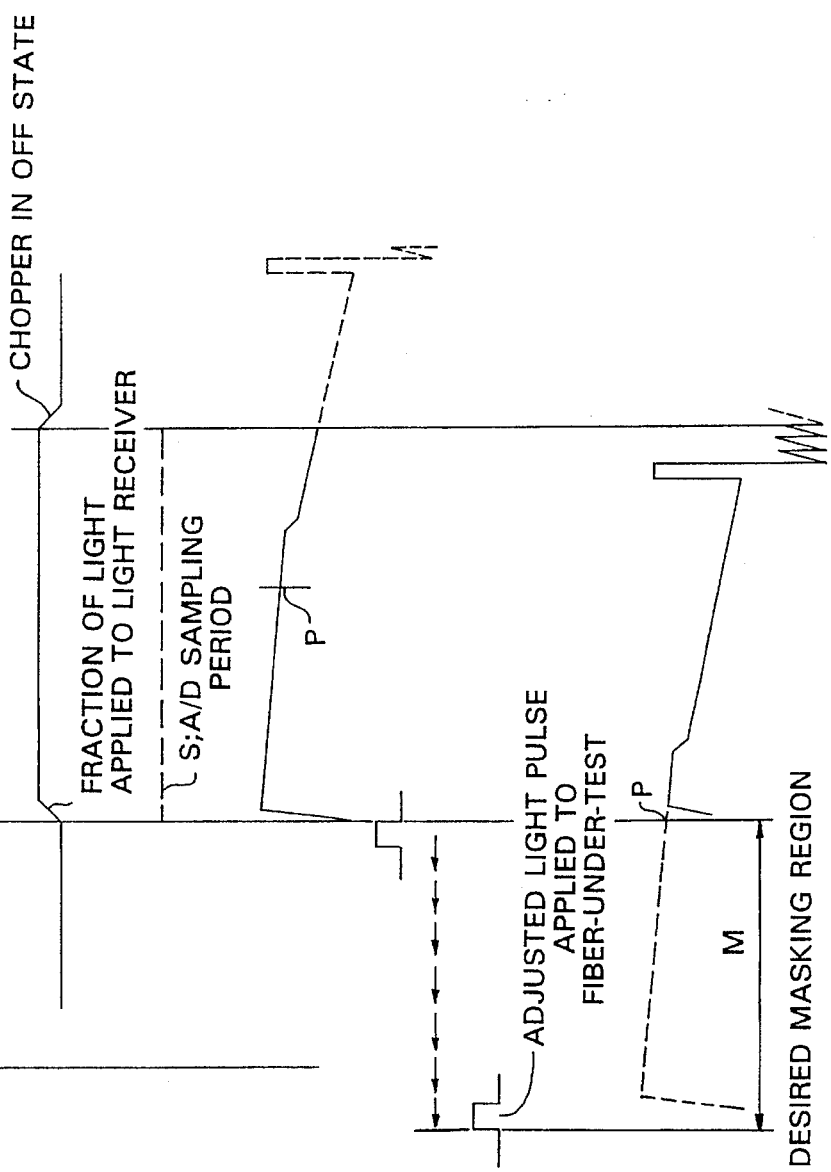

OPTICAL MASKING APPARATUS

BACKGROUND OF THE INVENTION

1. Field of the Invention

The present invention relates to an optical masking apparatus of an OTDR.

2. Prior Art

In a measurement of insertion loss of an optical fiber using an optical time domain reflectometer (OTDR), a reflected light through Fresnel lens (hereinafter referred to as a Fresnel reflected light) and a backward scattered light caused by a Rayleigh scattering are detected, thereby evaluating an insertion loss characteristic of the optical fiber in the longitudinal direction thereoff In this case, if the backward scattered light caused by Rayleigh scattering and a Fresnel reflected light in an optical fiber passage are measured at the same time by the OTDR, there is a large difference therebetween in level so that the backward scattered light can not be accurately estimated due to the influence by the Fresnel reflected light. As a result, accuracy of the measurement is deteriorated and a part of the optical fiber passage forms an area where the measurement can not be performed, which leads to the greatest drawback of the measurement by the OTDR.

To overcome such a drawback, there has been employed a so-called optical masking method for removing the Fresnel reflected light using a high-speed optical switch, thereby removing unnecessary reflected light. A conventional optical masking apparatus will be described with reference to FIG. 6.

An optical pulse generated by a pulse light source 11 is introduced into a high-speed optical switch 12 from the side A to side B thereof and it is irradiated from an optical output terminal 20 to an optical fiber 10 to be measured. Backward scattered light which is a part of a Fresnel reflected light or a Rayleigh scattered light from the optical fiber 10 to be measured is returned to the high-speed optical switch 12 by way of the optical output terminal 20. The returned light is introduced into the high-speed optical switch 12 from the side B to side C thereof.

At this time, the high-speed optical switch 12 may be switched to the side A for preventing unnecessary optical signal from being input to an optical/electric transducer 15 for realizing the optical masking. In this case, the high-speed optical switch 12 is operated in synchronization with the optical pulse which is generated by the pulse light source 11.

FIG. 7 shows a waveform of the OTDR which is displayed on an indicator 19.

In the optical masking apparatus of the OTDR as shown in FIG. 6, the insertion loss is large since the high-speed optical switch is used for optical masking. As a result, a dynamic range which is an important property of the OTDR is deteriorated. Moreover, alignment of optical axes in the high-speed optical switch is very difficult and troublesome. Furthermore, the high-sped optical switch is normally very expensive, which increases the cost of the OTDR.

SUMMARY OF THE INVENTION

It is therefor an object of the present invention to provide an optical masking apparatus for an OTDR capable of lowering an insertion loss and of easily aligning optical axes and of being structured at low cost.

To achieve this object, the optical masking apparatus according to the present invention comprises an optical pulse generating means, an optical branching/coupling means for permitting an optical pulse generated by the optical pulse generating means to be applied to an optical fiber to be measured, and an optical chopper means to which reflected light from the optical fiber is applied by way of the optical branching/coupling means wherein the optical chopper means operates in synchronization with the optical pulse, thereby removing a selected component of the reflected light.

The optical chopper means comprises for example a light receiver into which the reflected light is introduced and a chopper member for intercepting an optical passage extending from the lens to the light receiver in a given timing.

A masking function for removing unnecessary reflected light within necessary range at the portion close to the OTDR is achieved by varying the timing of ON and OFF operations of the optical chopper means which intercepts the optical passage and a light irradiating timing of the light source. Accordingly, it is possible to remove the Fresnel reflected component of the light light to secure a linearity in measuring the backward scattered light component.

If the optical chopper member is disposed in front of the light receiver, the optical signal which is introduced into the light receiver can be cut within a given time after the optical pulses start to be issued and the extent of the pulse signals to be cut can be freely set, thereby preventing the light receiver from being saturated with the optical signals.

Since the optical branching/coupling means and the optical chopper means are employed by the present invention, not only the low insertion loss characteristic but also a relatively low-priced circuit arrangement can be realized. Furthermore, the alignment of the optical axes in the high-speed optical switch is performed easily compared with that of the conventional optical switch, which results in sharp reduction of cost.

BRIEF DESCRIPTION OF THE DRAWINGS

FIGS. 4 (a) to 4(g) are waveforms of the elements of the apparatus in FIG. 1;

PREFERRED EMBODIMENT OF THE INVENTION

Figure 1:
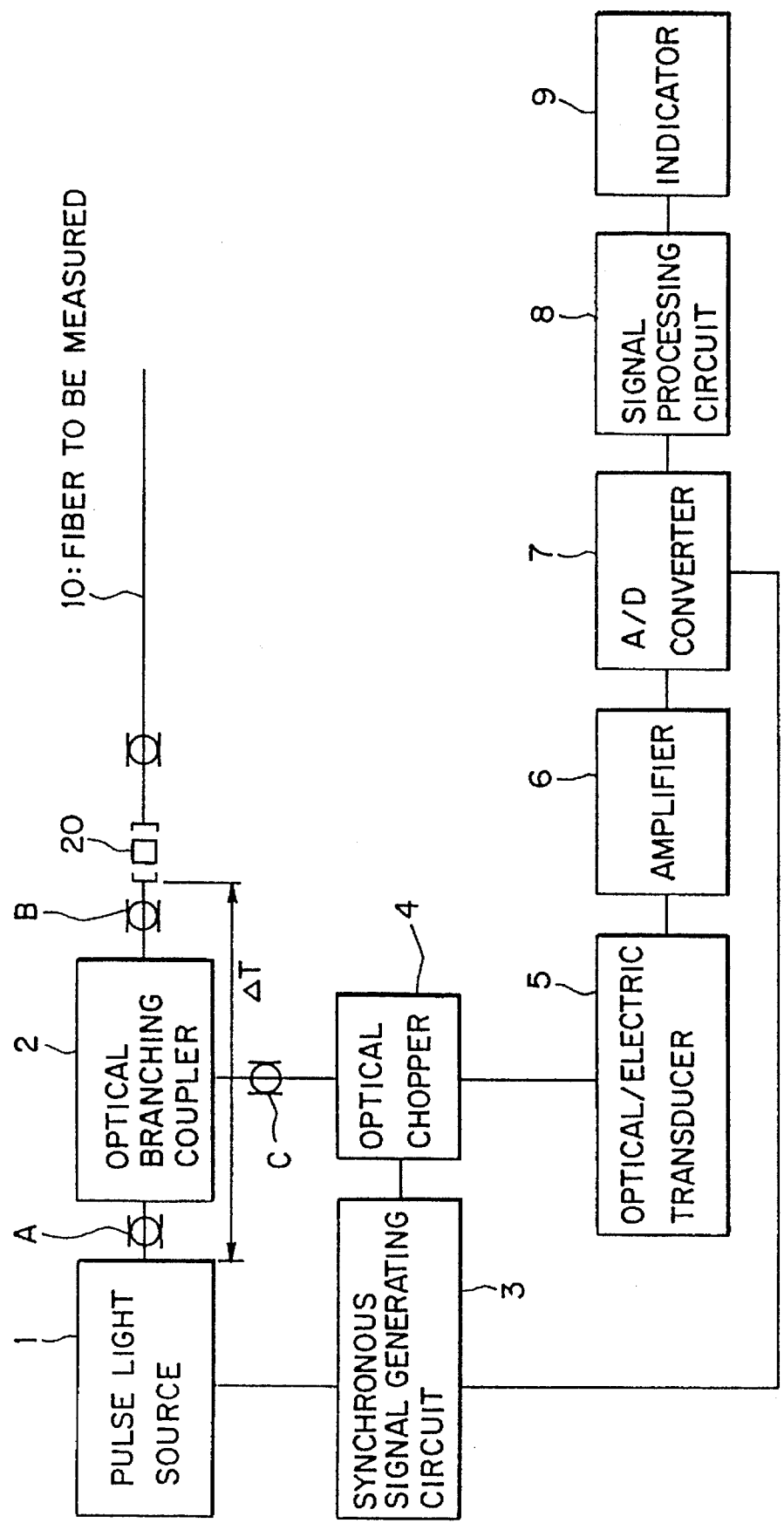
FIG. 1 is a circuit diagram of an optical masking apparatus of an OTDR according to a preferred embodiment of the present invention.

An optical masking apparatus of an OTDR according to a preferred embodiment of the present invention will be described with reference to FIGS. 1 to 5.

The optical masking apparatus comprises a pulse light source 1, an optical branching coupler 2, a synchronous signal generating circuit 3, an optical chopper 4, an optical/ electric transducer 5, an amplifier 6, an A/D converter 7, a signal processing circuit 8 and an indicator 9. The pulse light source 1 generates optical pulses in response to a trigger signal issued by the synchronous signal generating circuit 3. The optical branching coupler 2 permits the optical pulse issued by the pulse light source 1 to incident to an optical fiber 10 to be measured and a reflected light from the optical fiber 10 to be introduced into the optical chopper 4. The synchronous signal generating circuit 3 generates synchronous signals for operating the pulse light source 1, the optical chopper 4 and a sampling signal for the A/D converter.

The optical chopper 4 performs "ON" and "OFF" operations in response to the synchronous signal issued by the synchronous signal generating circuit 3 so as to remove a component of the reflected light from the optical fiber 10 or a leak signal issued by the pulse light source 1 serving as the optical pulse generator. The optical/electric transducer 5 converts the reflected light from the optical fiber 10 which is introduced thereinto by way of the optical chopper 4 into an electric signal. The amplifier 6 amplifies the electric signal from the optical/electric transducer 5 to a level adapted for the A/D conversion. The A/D converter 7 converts an analog signal to a digital signal. The signal processing circuit 8 processes a signal necessary for the OTDR in such a manner that the converted digital signal is subjected to an averaging process or to an LOG conversion. The indicator 9 displays a waveform produced during the process of the signal or a measured data.

Figure 2:
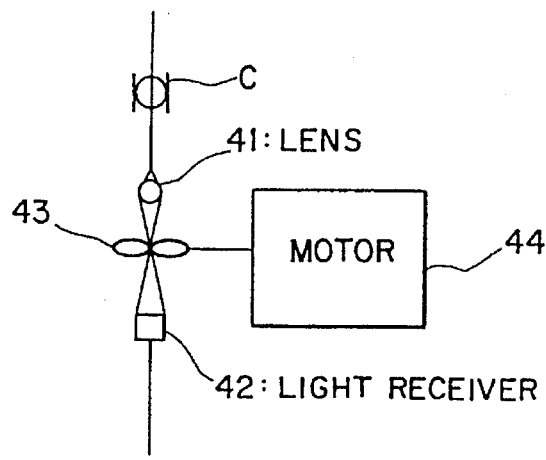
FIG. 2 is a view explaining an arrangement of an optical chopper employed by the apparatus in FIG. 1.

The optical chopper 4 is exemplified as shown in FIGS. 2 and 3. The optical chopper 4 in FIG. 2 is provided with a rotary blade 43 having a slit as a chopper member between a lens 41 and a light receiver 42. The rotary blade 43 is driven by a motor 44.

The motor 44 is preferable to be a DC servomotor or a pulse synchronous motor which is easily synchronized. As the rotary blade 43 is rotated, an optical passage extending from the lens 41 to the light receiver 42 is formed when the light passes through the slit while the optical passage is intercepted when the light is incident to a portion other than the slit, thereby performing the "ON" and "OFF" operations to permit the reflected light from the optical fiber 10 to pass through the rotary blade 43 or not.

Figures 3A, 3B:
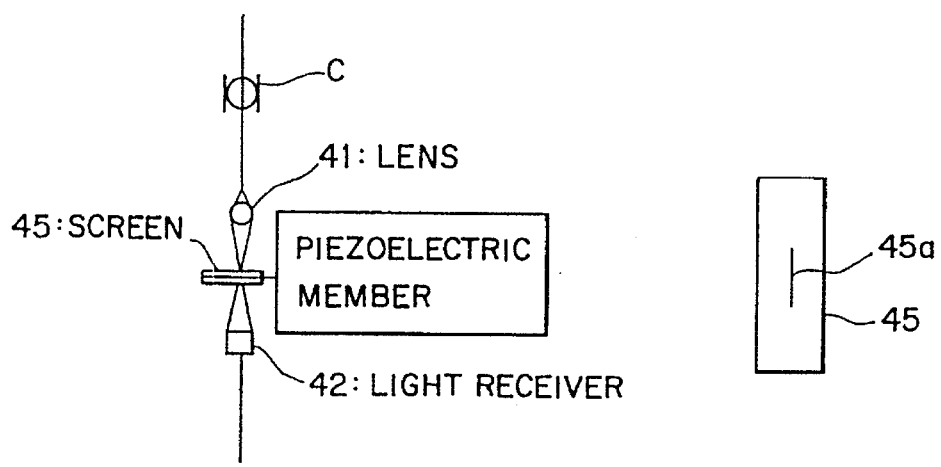
FIG. 3 (a) is a view for explaining another arrangement of the optical chopper employed by the apparatus in FIG. 1 and FIG. 3 (b) is a view for explaining a slit therein.

The optical chopper 4 shown in FIG. 3(a) is provided with a screen 45 as a chopper member between the lens 41 and the light receiver 42. The screen 45 has a slit 45a formed therein as shown in FIG. 3(b). The screen 45 is fixed to a piezoelectric member 46 by sticking the former to the latter, wherein the optical signal or reflected light from the lens 41 is stopped by oscillating the piezoelectric member 46 similarly to the example set forth above. It is possible to employ other members such as a crystal oscillator if it can displace the slit 45a by an external signal.

According to the preferred embodiment, the pulse light source 1 and the optical chopper 4 are synchronously operated in response to the synchronous signal generated by the synchronous signal generating circuit 3. A sampling signal for the A/D conversion by way of the A/D converter 7 is also generated in response to the synchronous signal as described above.

The reflected light from the optical fiber 10 and the leak signal from the pulse light source I are masked by the optical chopper 4 and other signals are input to the optical/electric transducer 5. In this case, an extent of masking, namely, an extent where the optical signal is cut can be varied and freely set by varying the timing of when the optical pulse is generated by the pulse light source 1 (a light emitting timing) based on a timing when the optical chopper 4 performs "ON" operation. The A/D converter 7 starts to perform the A/D conversion based on a timing when the optical chopper 4 performs On and Off state transitions.

A series of operations of the optical masking apparatus according to the present invention will now be described in detail with reference to FIGS. 4(a)–4(g). The timing when the optical pulse is irradiated from the output terminal 20 and a chopping timing by the optical chopper 4 are controlled by the synchronous signal generating circuit 3 and the optical masking apparatus is operated based on the chopping timing.

In FIG. 4, (a) shows a light emitting timing by the pulse light source 1, (b) shows a light irradiating timing at the output terminal 20. There is a time lag ΔT between these timings (refer to FIG. 1 ).

FIG. 4 (c) diagrammatically represents the fraction of the reflected light introduced into the light receiver 42 of the optical chopper 4 after the optical chopper 4 rises to the "ON" state at the light irradiating timing.

As seen in this Figure, immediately after the chopper transitions to the ON state, there is a small rise time when less than the full amount of light incident on the optical chopper is applied to the light receiver 42. After the rise time, the fraction of light applied to the light receiver 42 remains constant. Once the chopper transitions to the OFF state, there is a fall time where the light applied to light receiver 42 falls to zero. FIG. 4(c) also illustrates with a dashed line that a sampling period S, during which the A/D converter 7 is actuated to digitize the received light signal coincident with the ON state of the/optical chopper 4.

FIG. 4(d) depicts the component of the light transmitted by the optical chopper 4 when the light pulse is emitted by light source 1 at the time represented by FIG. 4(a) and the chopper is in the ON state as represented by FIG. 4(c). As seen in this figure, the transmitted component consists primarily of Rayleigh scattered and fresnel reflected light; the reflected pulse of light based on the generated pulse is shown phantom, having been blocked by the optical chopper 4, it is not transmitted.

Figure 5:
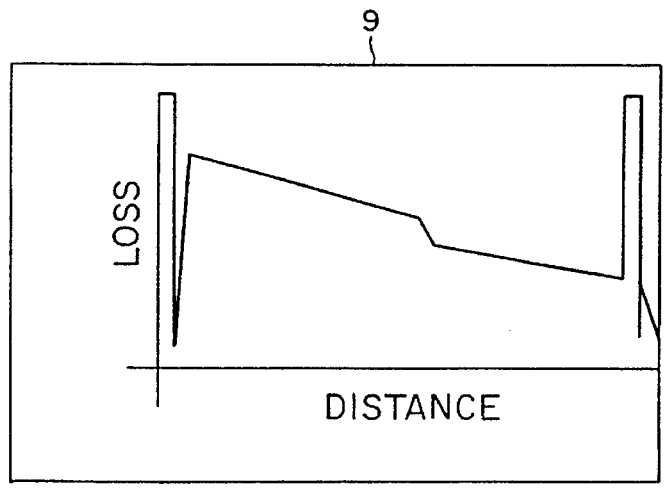
FIG. 5 is a graph showing a waveform of an OTDR which is obtained by the apparatus in FIG. 1.

FIGS. 4(e) and 4(f) illustrate how the time at which the light pulse is applied to the optical fiber under test is advanced relative to the start of the optical chopper ON state. This shifting of the pulse start time occurs as a result of the synchronizer 3 chronologically advancing the transmission optical pulse trigger signal to the pulse light source 1 relative to the generation of the optical chopper 4 ON signal. As a result of this shifting, the initial component, M, of the light applied to the optical chopper 4 is masked from the light receiver 42 until point P as represented by FIG. 4(g). The A/D convertor 7 thus receives and produces an output waveform illustrated by this figure that includes the reflected component of the pulse originally applied to the fiber 10. The waveform of the OTDR thus obtained is shown in FIG. 5.

Figure 6:
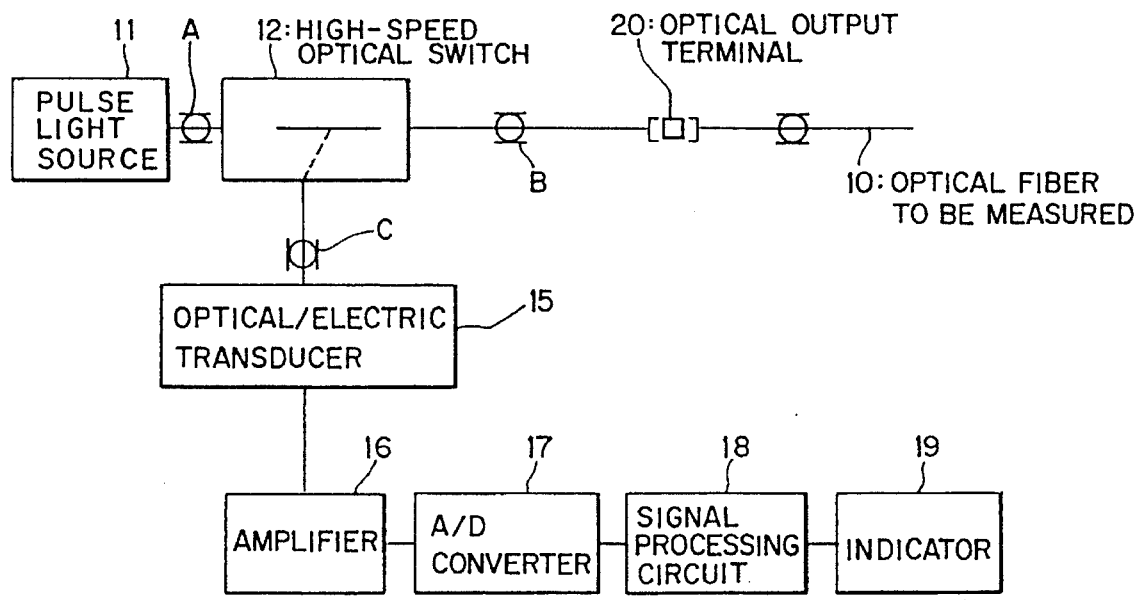
FIG. 6 is a prior art optical masking apparatus.
Figure 7:
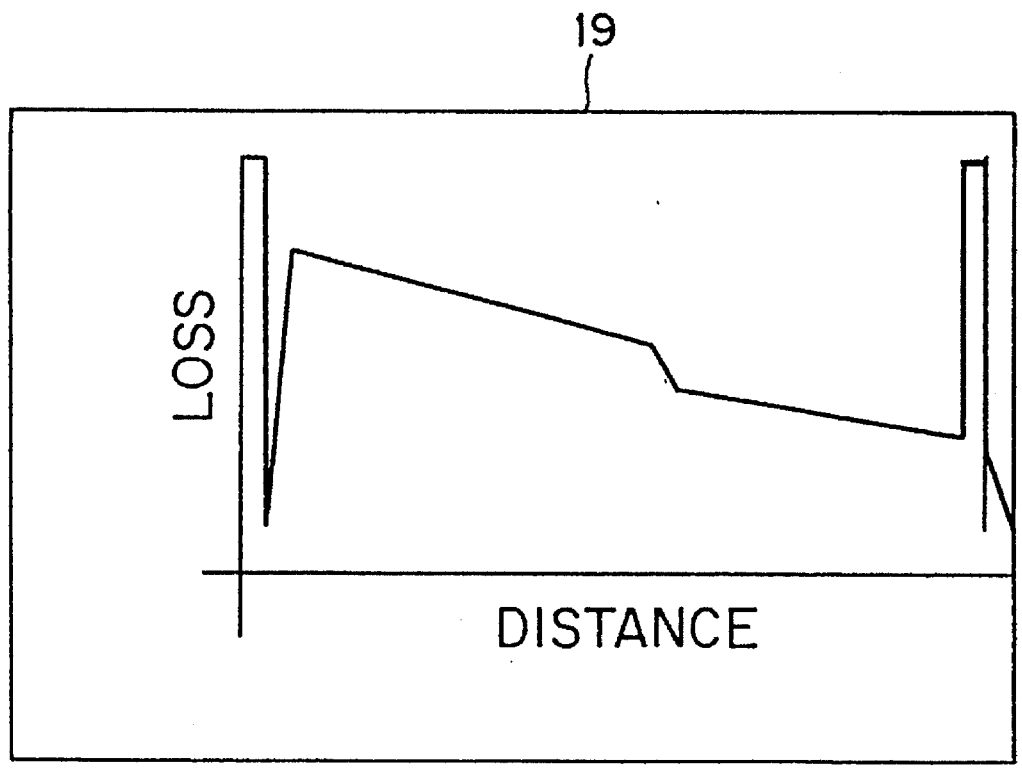
FIG. 7 is a graph showing a waveform which is displayed on an indicator of the prior art optical masking apparatus of an OTDR.

The optical masking apparatus according to the preferred embodiment can be reduced in size and power consumption compared with the conventional one illustrated in FIG. 6.

Furthermore according to the invention, it is possible to provide an optical masking apparatus capable of reducing the insertion loss, capable of easily aligning the optical axes in the high-speed optical switch and capable of being made at low cost.

What is claimed is:

1. An optical masking apparatus for an optical time domain reflectometer used to measure the transmissivity of an optical fiber, said apparatus comprising:

an optical pulse generator for generating a light pulse in response to a trigger signal;

an optical coupling assembly connected to said optical pulse generator and to the optical fiber for selectively applying said light pulse to the optical fiber and to direct light reflected from the optical fiber to an optical coupling assembly output port;

an optical chopper connected to said optical coupling assembly output port for receiving the reflected light from the optical fiber, said optical chopper having an ON state wherein the reflected light is transmitted through said optical chopper and an OFF state wherein said transmission of the reflected light is blocked, and being configured so that said ON/OFF state is controlled in response to an optical chopper ON/OFF synchronizing signal; and a synchronizing circuit connected to said optical pulse generator and to said optical chopper, said synchronizing circuit configured to generate said optical chopper ON/OFF synchronizing signal and said trigger signal, wherein said trigger signal is generated as a function of said optical chopper ON/OFF synchronizing signal.

2. The optical measurement apparatus of claim 1, wherein said optical chopper defines a light passageway through which light from said optical coupling assembly output port travels and includes a mechanical member positioned to selectively intersect said optical passageway to block said light transmission when said optical chopper is in said OFF state.

3. The optical masking apparatus of claim 2, wherein the optical time domain reflectometer includes a monitoring circuit connected to receive said light transmitted by said optical chopper, the monitoring circuit being configured to produce data based on said received light and being selectively actuatable and said synchronizing circuit is further configured to selectively actuate the monitoring circuit so that the monitoring circuit generates data based on said received light when said optical chopper is in said ON state.

4. The masking apparatus of claim 2, wherein said optical chopper includes a rotary blade positioned to selectively block said light passageway and a motor attached to said rotary blade for selectively rotating said rotary blade, said motor being driven in response to said optical chopper ON/OFF synchronizing signal.

5. The optical masking apparatus of claim 2, wherein said optical chopper includes a screen formed with a slit, said screen being positioned in said light passageway so that said light will pass through said slit and a drive assembly attached to said screen for oscillating said screen so as to cause said screen to block transmission of light through said light passageway, said drive assembly being driven in response to said optical chopper ON/OFF synchronizing signal.

6. The optical masking apparatus of claim 1, wherein the optical time domain reflectometer includes a monitoring circuit connected to receive said light transmitted by said optical chopper, the monitoring circuit being configured to produce data based on said received light and being selectively actuatable and said synchronizing circuit is further configured to selectively actuate the monitoring circuit so that the monitoring circuit generates data based on said received light when said optical chopper is in said ON state.

7. An optical time domain reflectometer for measuring the transmissivity of an optical fiber, said reflectometer including:

an optical pulse generator for generating a light pulse in response to a trigger signal;

an optical coupling assembly connected to said optical pulse generator and to the optical fiber for selectively applying said light pulse to the optical fiber and to direct light reflected from the optical fiber to an optical coupling assembly output port;

an optical chopper connected to said optical coupling assembly output port for receiving the reflected light from the optical fiber, said optical chopper defining a light passageway through which light from said optical coupling assembly passes and having a mechanical member positioned to selectively block said optical-passageway and a drive unit connected to selectively actuate said mechanical member so that when said optical chopper is in an ON state, said mechanical member is spaced from said light passageway and when said optical chopper is in an OFF state, said mechanical member blocks light passage through said optical passageway, said drive unit being configured to move said mechanical member in and out of said light passageway in response to an optical chopper ON/OFF signal;

a monitoring circuit connected to receive said light transmitted by said optical chopper, said monitoring circuit being configured to produce data based on said received light and being selectively actuatable; and a synchronizing circuit connected to said optical pulse generator, to said optical chopper and to said monitoring circuit, said synchronizing circuit being configured to generate said optical chopper ON/OFF signal and said trigger signal, and to control said actuation of said monitoring circuit, wherein said trigger signal is generated and said monitoring circuit is controlled as a function of said optical chopper ON/OFF signal.

8. The reflectometer of claim 7, wherein said optical chopper includes a rotary blade positioned to selectively block said light passageway and a motor attached to said rotary blade for selectively rotating said rotary blade, said motor being driven in response to said optical chopper ON/OFF signal.

9. The reflectometer of claim 7, wherein said optical chopper includes a screen formed with a slit, said screen being positioned in said light passageway so that said light will extend through said slit and a drive assembly attached to said screen for oscillating said screen so as to cause said screen to block transmission of light through said light passageway, said drive assembly being driven in response to said optical chopper ON/OFF signal.

10. The reflectometer of claim 7, wherein said monitoring circuit includes:

a transducer connected to said optical chopper to receive said light transmitted therethrough, said transducer being configured to produce a transducer signal based on said light received thereby; and an analog-to-digital signal converter for receiving a signal based on said transducer signal, said analog-to-digital signal converter being configured to produce a digitized version of said transducer signal and being selectively actuatable in response to an actuation signal; and said synchronizing circuit is connected to said analog-to-digital signal converter to selectively transmit said actuation signal thereto as a function of said optical chopper ON/OFF signal.

* * * * *